(12) United States Patent
Suga et al.

(10) Patent No.: US 10,627,007 B2
(45) Date of Patent: Apr. 21, 2020

(54) FLUID CONTROL VALVE

(71) Applicant: SMC CORPORATION, Chiyoda-ku (JP)

(72) Inventors: Naoyuki Suga, Kawaguchi (JP); Masahiko Yoshiwara, Toride (JP)

(73) Assignee: SMC CORPORATION, Chiyoda-ku (JP)

( * ) Notice: Subject to any disclaimer, the term of this patent is extended or adjusted under 35 U.S.C. 154(b) by 17 days.

(21) Appl. No.: 16/093,993

(22) PCT Filed: Apr. 12, 2017

(86) PCT No.: PCT/JP2017/014948
§ 371 (c)(1),
(2) Date: Oct. 16, 2018

(87) PCT Pub. No.: WO2017/187980
PCT Pub. Date: Nov. 2, 2017

(65) Prior Publication Data
US 2019/0063466 A1 Feb. 28, 2019

(30) Foreign Application Priority Data
Apr. 27, 2016 (JP) .................................. 2016-089423

(51) Int. Cl.
*F16K 31/122* (2006.01)
*F15B 11/00* (2006.01)
*F15B 11/06* (2006.01)

(52) U.S. Cl.
CPC ............ *F16K 31/122* (2013.01); *F15B 11/00* (2013.01); *F15B 11/06* (2013.01)

(58) Field of Classification Search
CPC .......... F15B 11/00; F15B 11/06; F16K 31/122
(Continued)

(56) References Cited

U.S. PATENT DOCUMENTS 4,147,179 A * 4/1979 Miura ..................... F15B 13/02
137/599.09
6,131,610 A * 10/2000 Morisako ................ F15B 13/01
137/601.19

(Continued)

FOREIGN PATENT DOCUMENTS

JP 53-39519 4/1978
JP 2000-320503 A 11/2000
(Continued)

OTHER PUBLICATIONS

International Search Report dated Jun. 13, 2017 in PCT/JP2017/014948 filed Apr. 12, 2017.

*Primary Examiner* — Umashankar Venkatesan
(74) *Attorney, Agent, or Firm* — Oblon, McClelland, Maier & Neustadt, L.L.P.

(57) ABSTRACT

A fluid control valve includes a first flow path and a second flow path that connect a first port and a second port in parallel. The first flow path includes an opening and closing valve mechanism that temporarily opens the first flow path. The second flow path includes a throttle valve mechanism that restrictedly opens the second flow path. The opening and closing valve mechanism includes an opening and closing valve portion including an opening and closing valve seat and an opening and closing valve body, a valve opening force generator, and a delay valve closing mechanism that closes the opening and closing valve body after a delay time has elapsed. The throttle valve mechanism includes a throttle valve portion. The opening area of the opening and closing valve portion is larger than the opening area of the throttle valve portion.

9 Claims, 10 Drawing Sheets (58) Field of Classification Search
USPC .......................... 137/599.01, 599.09, 599.18
See application file for complete search history.

(56) References Cited

U.S. PATENT DOCUMENTS

| | | | |
|---|---|---|---|
| 6,227,231 B1 | 5/2001 | Hosono et al. | |
| 6,296,013 B1 | 10/2001 | Hosono et al. | |
| 10,030,677 B2 * | 7/2018 | Shishido | F16K 15/00 |
| 2016/0208825 A1 | 7/2016 | Shishido | |

FOREIGN PATENT DOCUMENTS

| | | |
|---|---|---|
| JP | 2000-322128 A | 11/2000 |
| WO | WO 2015/029866 A1 | 3/2015 |

* cited by examiner

FLUID CONTROL VALVE

TECHNICAL FIELD

The present invention relates to a fluid control valve that controls the flow rate, pressure, etc. of a pressure fluid supplied to or discharged from an actuator such as a fluid pressure cylinder.

BACKGROUND ART

As fluid control valves that, when an actuator such as a fluid pressure cylinder is driven, control the flow rate, pressure, etc. of a pressure fluid supplied to or discharged from the actuator, fluid control valves having various configurations are known as disclosed in, for example, Patent Literatures, PTL 1 and PTL 2.

This type of fluid control valve is configured so as to have various functions according to the purpose of use as a fluid control valve that performs meter-in type control in which the flow rate at the time of supplying air is restricted and the flow rate at the time of discharging air is not restricted, a fluid control valve that performs meter-out type control in which the flow rate at the time of supplying air is not restricted and the flow rate at the time of discharging air is restricted, a fluid control valve that performs rapid discharge at the time of discharging air to prevent the operation delay, etc. usually by combining a needle valve that restricts the flow rate or pressure of the pressure fluid by narrowing the flow path, a flow rate control valve that opens and closes the flow path by interaction between the fluid pressure and the spring force, a check valve that allows the pressure fluid to flow only in one direction, etc.

However, in the foregoing conventional fluid control valves, the needle valve, the flow rate control valve, the check valve, etc. are separately incorporated in the valve housing, so that many of them are complicated in structure and large in size, and there is a problem that they are inconvenient for adjustment and handling and are not user-friendly. The advent of a fluid control valve that is further reduced in size and user-friendly has been desired.

Therefore, as disclosed in Patent Literature, PTL 3, the applicant of the present invention proposed a fluid control valve in which the function of the needle valve and the function of the flow rate control valve are, in a unified state, incorporated coaxially into the valve housing and that, compared with the conventional fluid control valves, is simple in structure, small in size, and user-friendly and has a rational design structure.

However, when this fluid control valve is used for applications in which the fluid pressure actuator is required to have higher responsiveness than usual, in order to prevent operation delay of the fluid pressure actuator from, it is necessary to further improve the fluid control capability of the fluid control valve.

CITATION LIST

Patent Literature

PTL 1: Japanese Unexamined Patent Application Publication No. 2000-320503
PTL 2: Japanese Unexamined Patent Application Publication No. 2000-322128
PTL 3: International Publication No. 2015/029866

SUMMARY OF INVENTION

Technical Problem

It is therefore an object of the present invention to provide a fluid control valve that is simple in structure and reduced in size and that has better fluid control capability when connected to a fluid pressure circuit.

Solution to Problem

To attain the above object, the fluid control valve of the present invention includes a first port and a second port provided in a valve body, and a first flow path and a second flow path that connect the first port and the second port in parallel. The first flow path is provided with an opening and closing valve mechanism that temporarily opens the first flow path when pressure fluid is supplied to the first port. The second flow path is provided with a throttle valve mechanism that restrictedly opens the second flow path. The opening and closing valve mechanism has an opening and closing valve portion including an opening and closing valve seat that surrounds the first flow path and an opening and closing valve body that comes into contact with and separates from the opening and closing valve seat to open and close the first flow path, a valve opening force generating means that generates a valve opening force in the opening and closing valve body, and a delay valve closing mechanism that closes the opened opening and closing valve body after a delay time has elapsed. The throttle valve mechanism has a throttle valve portion including a throttle hole that forms a part of the second flow path and a needle that fits into the throttle hole. The opening and closing valve portion and the throttle valve portion are disposed coaxially along an axis passing through the inside of the valve body. The opening area when the opening and closing valve body temporarily opens the first flow path is larger than the opening area when the throttle valve portion restrictedly opens the second flow path.

According to a concrete configuration mode of the present invention, the delay valve closing mechanism has a first piston connected to the opening and closing valve body, a first pressure chamber faced by the first piston, and a delay flow path connecting the first pressure chamber and the first port, a throttle portion is formed in the delay flow path, and when a valve closing force generated in the first piston by the action of the pressure fluid introduced into the first pressure chamber through the delay flow path exceeds the valve opening force generated in the opening and closing valve body by the valve opening force generating means, the opening and closing valve body is pressed against the opening and closing valve seat by the displacement of the first piston to close the first flow path.

Preferably in the present invention, an inner body is accommodated in the valve body so as to be displaceable along the axis, the opening and closing valve body and the first piston are formed in the inner body, and the opening and closing valve seat is formed in the valve body.

A valve rod may be accommodated inside the inner body so as to be displaceable along the axis, the needle may be formed in the valve rod, and the throttle hole may be formed in the inner body. In this case, it is preferable that the valve rod is provided with a second piston, the second piston faces a second pressure chamber formed inside the inner body, the second pressure chamber communicates with the second port through a conduction hole formed inside the valve rod, and when the fluid pressure in the second port is introduced into the second pressure chamber through the conduction hole, the second piston is displaced by the action of the fluid pressure, and the needle closes the throttle hole.

It is preferable that a needle opening spring is interposed between the inner body and the valve rod, and the needle opening spring constantly urges the valve rod toward a position where the needle restrictedly opens the throttle hole.

The present invention may further include a third flow path connecting the first port and the second port, the third flow path may be provided with a first check valve, and the first check valve may prevent a forward flow of the pressure fluid from the first port toward the second port, and may allow a backward flow of the pressure fluid from the second port toward the first port.

According to a configuration mode of the present invention, the valve opening force generating means is a valve opening pressure receiving surface formed in the opening and closing valve body, and the valve opening pressure receiving surface receives the action of the pressure fluid supplied to the first port to generate the valve opening force.

According to another configuration mode of the present invention, the valve opening force generating means is a valve opening spring that is interposed between the valve body and the opening and closing valve body and urges the opening and closing valve body in the valve opening direction.

Advantageous Effects of Invention

The fluid control valve of the present invention can realize simplification of structure and reduction in size by reasonably incorporating the functions of a needle valve, a flow rate control valve, a check valve, etc. into one valve body, and can improve the fluid control capability and the responsiveness by providing an opening and closing valve mechanism that temporarily opens the flow path when pressure fluid is supplied to the first port.

DESCRIPTION OF EMBODIMENTS

Figure 5:
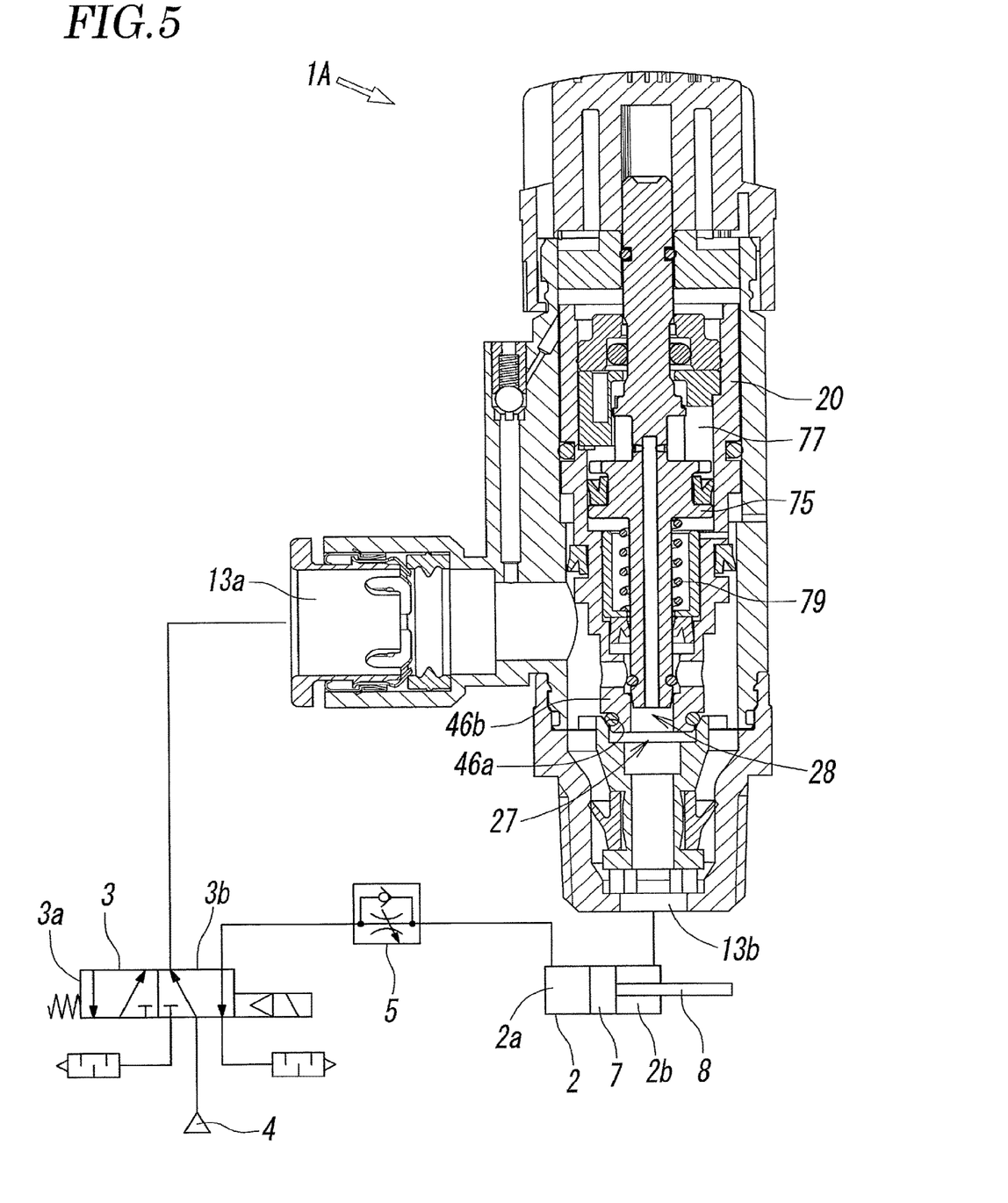
FIG. 5 is a sectional view showing the operating state of the fluid control valve when the fluid pressure cylinder is at an intermediate point of the working stroke in the fluid pressure circuit.
Figure 6:
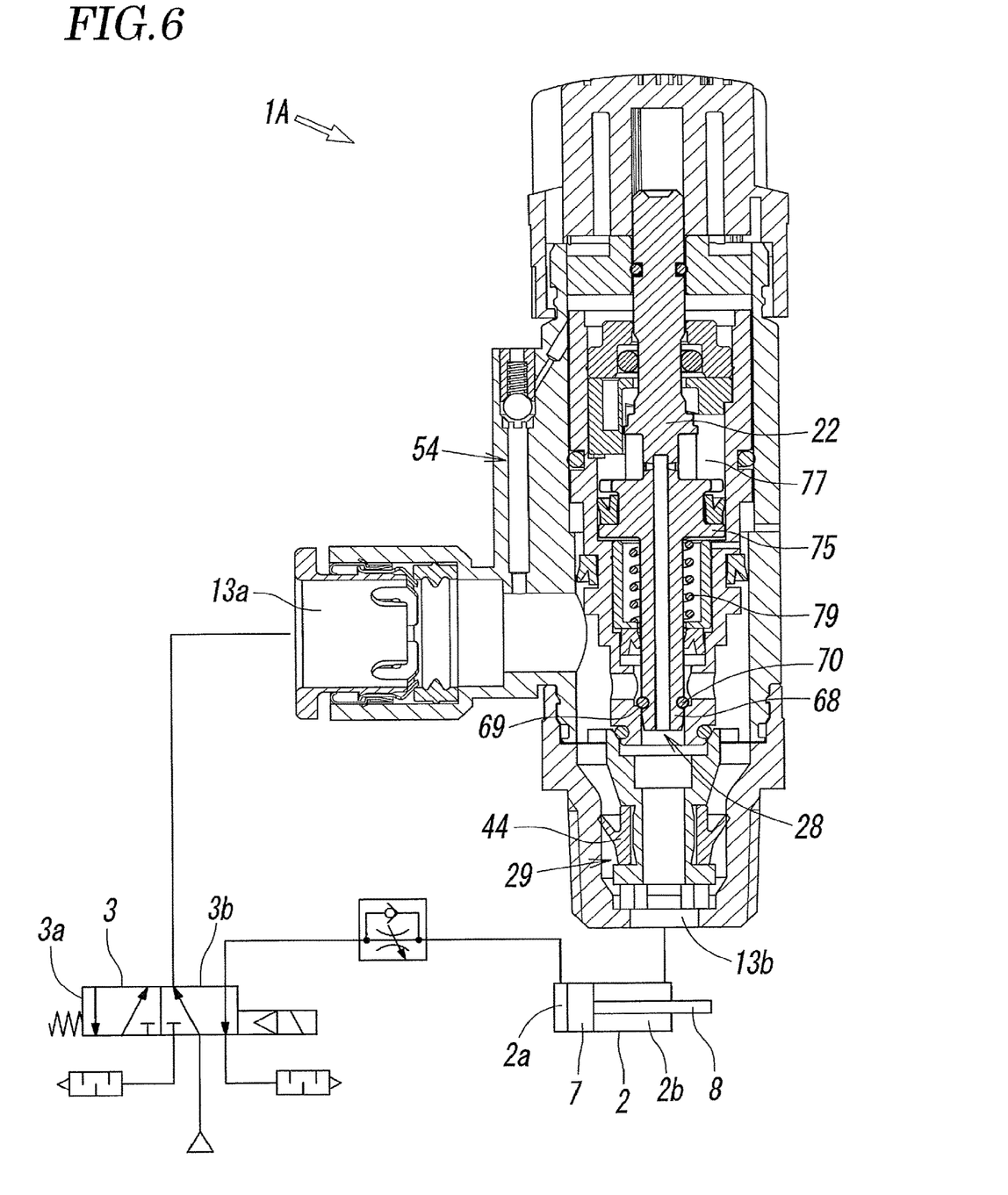
FIG. 6 is a sectional view showing the operating state of the fluid control valve when the fluid pressure cylinder reaches the working stroke end in the fluid pressure circuit.
Figure 7:
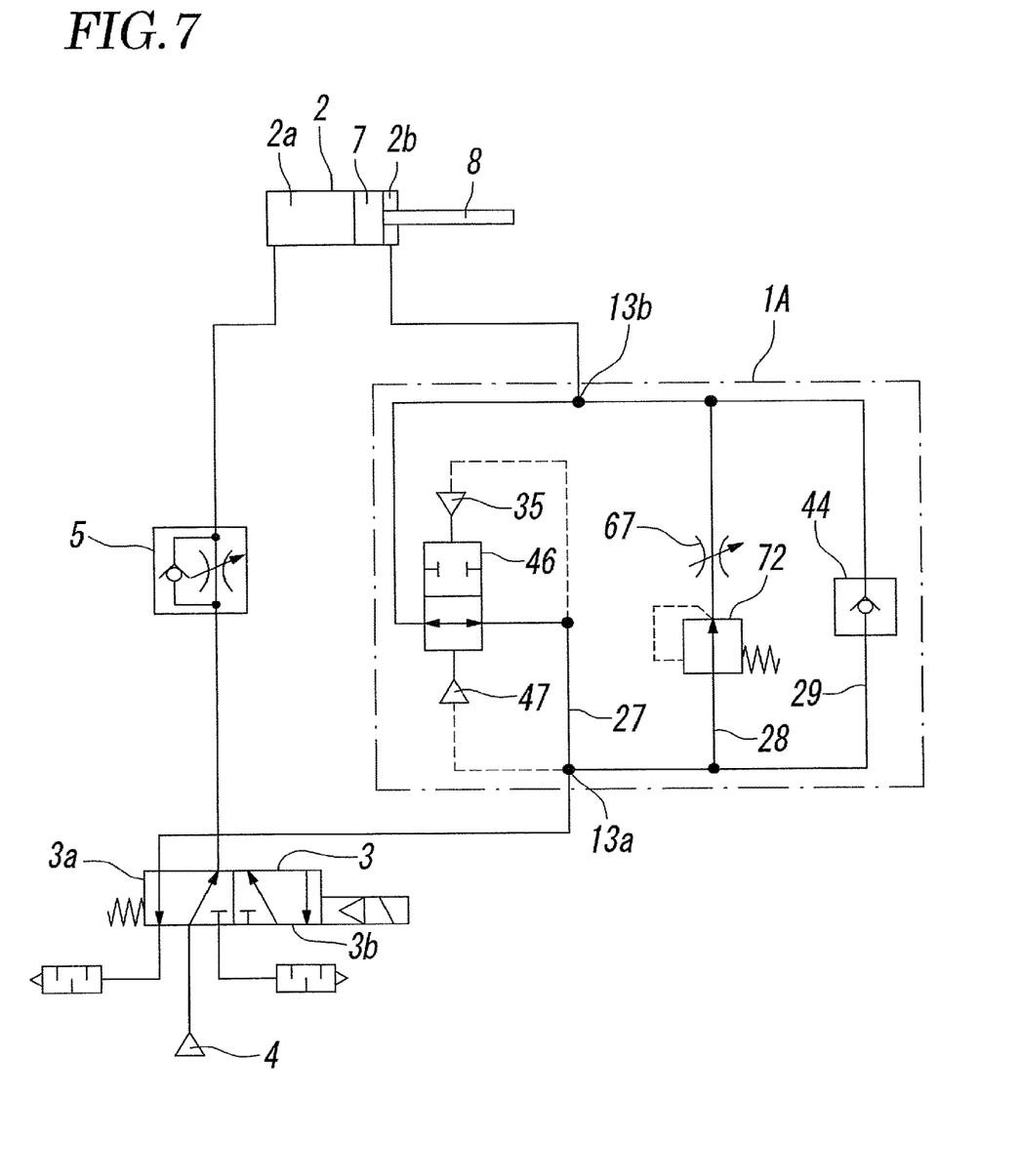
FIG. 7 is a circuit diagram in the case where the fluid control valve is symbolized.

FIGS. 1 to 6 are sectional views of a state where a fluid control valve 1A according to a first embodiment of the present invention is connected to a fluid pressure circuit, and FIG. 7 shows the fluid control valve 1A using symbols.

The fluid control valve 1A is a meter-in control type fluid control valve that controls the flow rate of pressure fluid supplied from a pressure fluid source 4 through a solenoid valve 3 and supplies it to a fluid pressure actuator 2.

In FIGS. 1 to 7, the fluid pressure actuator 2 is a fluid pressure cylinder, the solenoid valve 3 is a 5 port valve, and the pressure fluid is compressed air. Reference sign 5 denotes a speed controller, and the speed controller 5 includes a check valve 5a and a variable throttle valve 5b.

Figure 1:
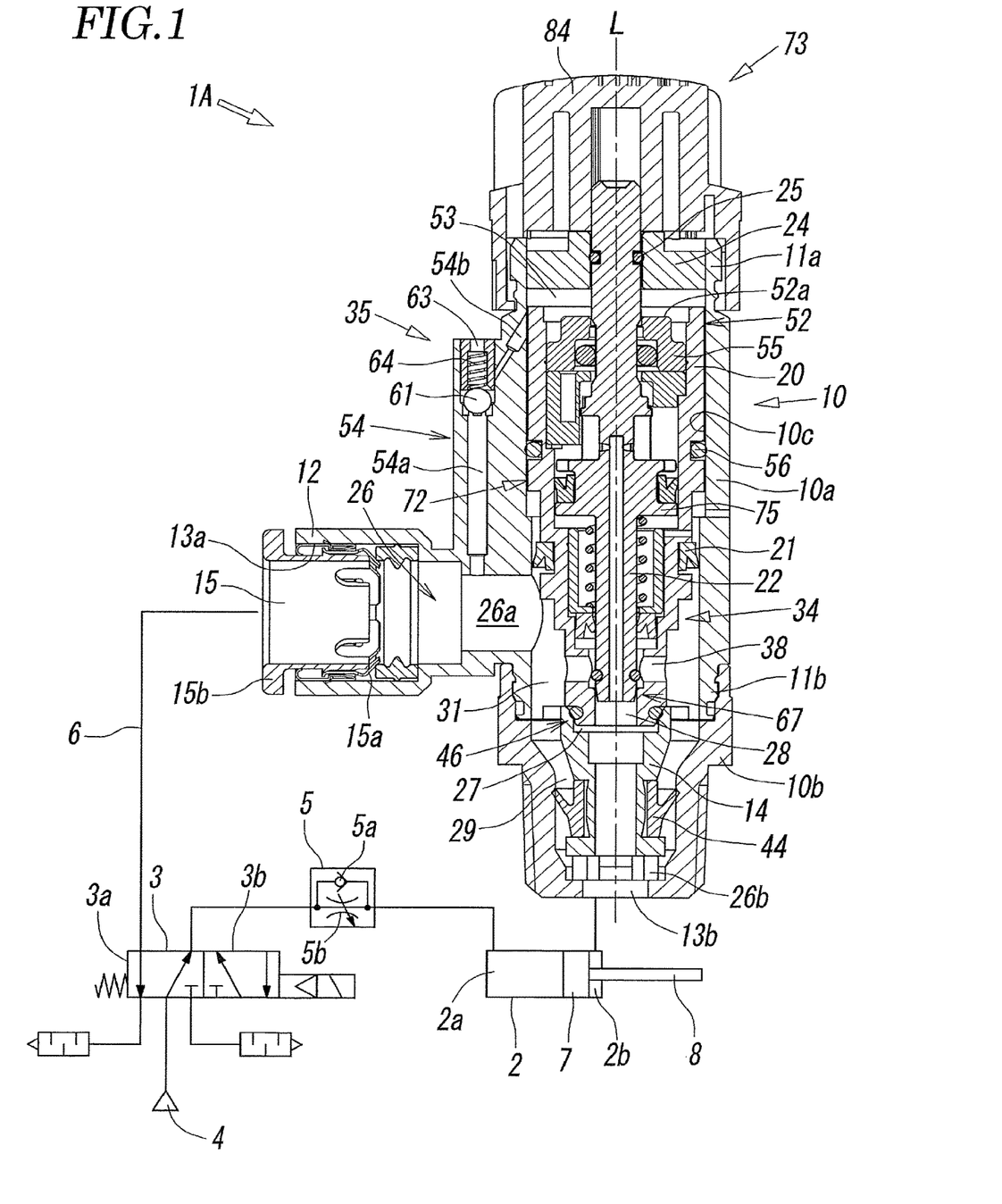
FIG. 1 is a sectional view of a state where a fluid control valve according to a first embodiment of the present invention is connected to a fluid pressure circuit, and is a view in a case where a fluid pressure cylinder is at the advancing end.
Figure 2:
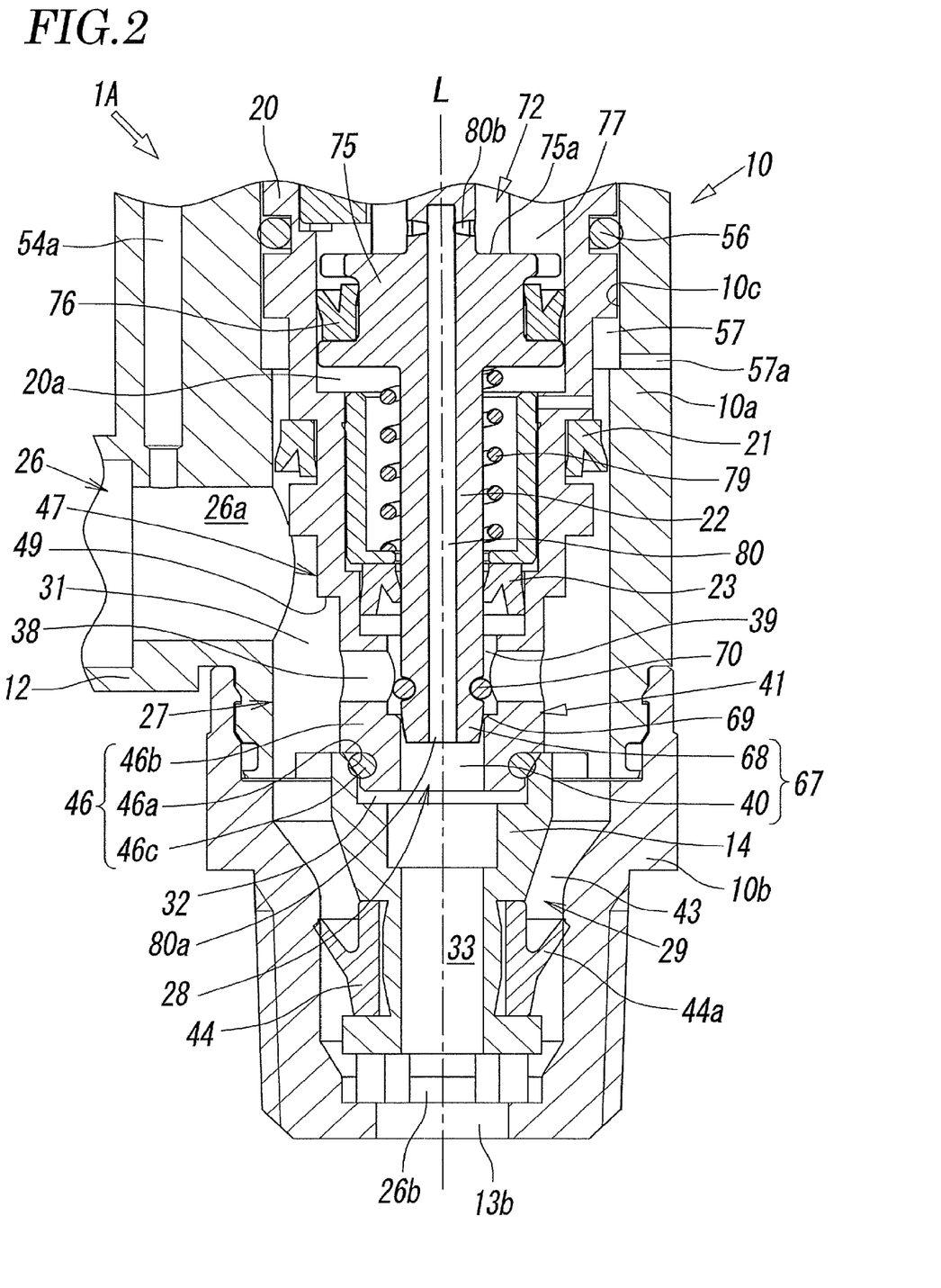
FIG. 2 is an enlarged view of a main part of FIG. 1.
Figure 3:
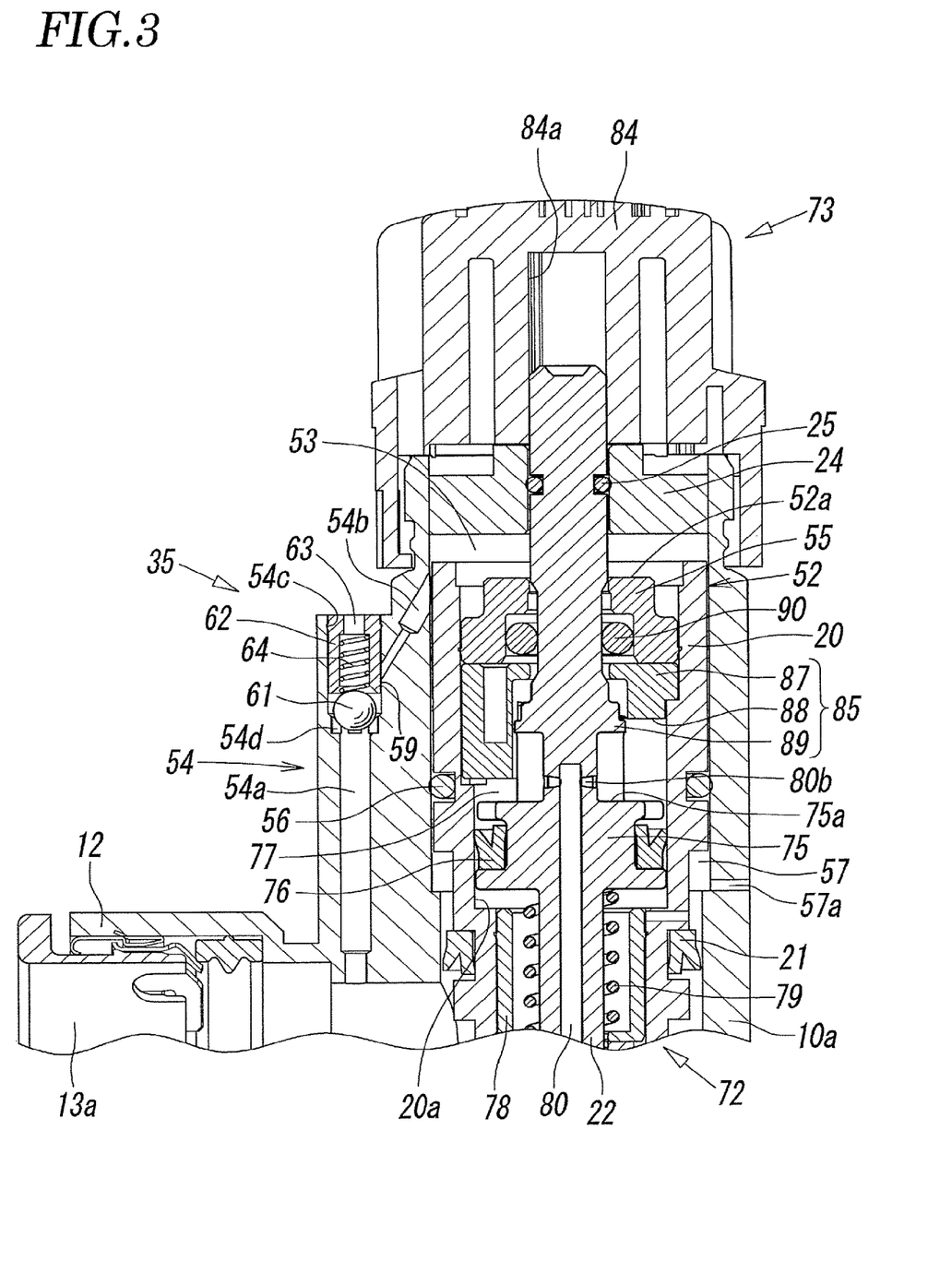
FIG. 3 is an enlarged view of a main part of FIG. 1.

As shown in FIGS. 1 to 3, the fluid control valve 1A has a valve body 10 having a substantially cylindrical shape extending along the axis L. The valve body 10 has a hollow first body portion 10a and a hollow second body portion 10b connected to the lower end of the first body portion 10a. In the following description, the upper end of the valve body 10 is referred to as a first end 11a, and the lower end of the valve body 10 is referred to as a second end 11b.

A hollow port forming portion 12 is formed on the side surface of the first body portion 10a so as to protrude in a direction orthogonal to the axis L, a first port 13a is formed at the tip of the port forming portion 12, and a second port 13b is formed at the lower end of the second body portion 10b, that is, the second end 11b so as to open in the direction of the axis L. A cylindrical member 14 for forming a flow path is disposed at a position on the axis L inside the second body portion 10b so as to be coaxial with the second body portion 10b. The cylindrical member 14 forms a part of the second body portion 10b and is therefore a part of the valve body 10.

A simple connection type pipe joint 15 is attached to the first port 13a. As for the pipe joint 15, when one end of a pipe 6 connected to the fluid pressure cylinder 2 is inserted into the pipe joint 15, a plurality of locking pieces 15a bite into the outer periphery of the pipe 6 and therefore lock the pipe 6 so that the pipe 6 is in a come-off prevention state, and when a release bushing 15b is pushed into the pipe joint 15, the tip of the release bushing 15b expands the locking pieces 15a outwardly and separate the locking pieces 15a from the pipe 6 so that the pipe 6 can be pulled out.

Inside the hollow hole 10c of the first body portion 10a, a cylindrical inner body 20 is accommodated so as to be coaxial with the first body portion 10a and slidable along the axis L, with a unidirectional first seal member 21 having a V-shaped cross section therebetween. Inside the inner body 20, a columnar valve rod 22 is accommodated so as to be coaxial with the inner body 20 and slidable along the axis L, with a unidirectional second seal member 23 having a V-shaped cross section therebetween.

An end plate 24 is airtightly fixed to the upper end, that is, the first end 11a-side end of the first body portion 10a, at a position outside the end portion of the inner body 20, so as to cover the end portion of the inner body 20. The upper end of the valve rod 22 airtightly penetrates the end plate 24 with a seal member 25 therebetween and protrudes to the outside of the end plate 24.

A fluid flow path 26 connecting the first port 13a and the second port 13b is formed inside the valve body 10. The fluid flow path 26 branches into a first flow path 27, a second flow path 28, and a third flow path 29 that are parallel to each other between a first merging hole 26a connected to the first port 13a and a second merging hole 26b connected to the second port 13b.

The first flow path 27 is a flow path that leads from the first merging hole 26a, through a first annular flow path hole 31 formed between the inner peripheral surface of the first body portion 10a and the outer peripheral surface of the inner body 20, an opening and closing hole 32 at the upper end of the cylindrical member 14, and a central hole 33 leading to the opening and closing hole 32, and communicates with the second merging hole 26b. The first flow path 27 is a flow path for temporarily opening the fluid flow path 26 to a fully opened state or a state close to the fully opened state in the initial stage when the pressure fluid is supplied to the fluid pressure cylinder 2. For this purpose, the first flow path 27 is provided with an opening and closing valve mechanism 34, and a delay valve closing mechanism 35 for closing the opened first flow path 27 after elapse of the delay time.

The second flow path 28 is a flow path that leads from the first annular flow path hole 31, through a plurality of branch holes 38 radially formed in the inner body 20, a rod insertion hole 39 in the inner body 20, a throttle hole 40 leading to the rod insertion hole 39, and the central hole 33 in the cylindrical member 14, and communicates with the second merging hole 26b. The second flow path 28 is a flow path for performing the meter-in control by restrictedly supplying the pressure fluid to the fluid pressure cylinder 2. For this purpose, the second flow path 28a is provided with a throttle valve mechanism 41.

The third flow path 29 is a flow path that leads from the first annular flow path hole 31, through a second annular flow path 43 formed between the inner peripheral surface of the second body portion 10b and the outer peripheral surface of the cylindrical member 14, to the second merging hole 26b. The third flow path 29 is closed when the pressure fluid is supplied to the fluid pressure cylinder 2, and is a flow path for discharging the pressure fluid in a free flow state when the pressure fluid is discharged from the fluid pressure cylinder 2. For this purpose, the third flow path 29 is provided with a first check valve 44.

The first check valve 44 is formed by a unidirectional seal member having a Y-shaped cross section, and, by directing the lip 44a toward the first port 13a, prevents a forward flow of the pressure fluid from the first port 13a toward the second port 13b, and allows a backward flow of the pressure fluid from the second port 13b toward the first port 13a.

The opening and closing valve mechanism 34 provided in the first flow path 27 has an opening and closing valve portion 46 including an annular opening and closing valve seat 46a surrounding the opening and closing hole 32 and an opening and closing valve body 46b that comes into contact with and separates from the opening and closing valve seat 46a to open and close the opening and closing hole 32, that is, the first flow path 27, and a valve opening force generating means 47 that generates a valve opening force in the opening and closing valve body 46b.

The opening and closing valve seat 46a is formed in the cylindrical member 14, and the opening and closing valve body 46b is formed at the lower end of the inner body 20.

An opening and closing valve seal 46c that comes into contact with and separates from the opening and closing valve seat 46a is attached to the opening and closing valve body 46b. The seal diameter when the opening and closing valve seal 46c is in contact with the opening and closing valve seat 46a is made smaller than the seal diameter of a portion where the first seal member 21 is in contact with the inner peripheral surface of the first body portion 10a. Due to such a relationship of seal diameters, a valve opening pressure receiving surface 49 based on the difference in the seal diameter is formed on the outer peripheral surface of a part of the opening and closing valve body 46b located between the opening and closing valve seal 46c and the first seal member 21. When the pressure fluid from the first port 13a acts on the valve opening pressure receiving surface 49, a thrust force in the upward direction (valve opening direction), that is, a valve opening force is generated in the opening and closing valve body 46b. Due to this valve opening force, the opening and closing valve seal 46c of the opening and closing valve body 46b separates from the opening and closing valve seat 46a and opens the first flow path 27. Therefore, in this embodiment, the valve opening pressure receiving surface 49 is substantially the valve opening force generating means 47.

Although the opening and closing valve seal 46c of the opening and closing valve body 46b actually comes into contact with and separates from the opening and closing valve seat 46a, since the opening and closing valve seal 46c is a part of the opening and closing valve body 46b, in the following description, the opening and closing valve body 46b may be described as coming into contact with and separating from the opening and closing valve seat 46a.

The delay valve closing mechanism 35 has a first piston 52 formed at the upper end of the inner body 20, a first pressure chamber 53 defined between the first piston 52 and the end plate 24 at the upper end of the valve body 10, and a delay flow path 54 connecting the first pressure chamber 53 to the first port 13a.

The first piston 52 is formed by airtightly fixing a closing plate 55 that closes the upper end portion of the hollow inner body 20, to the upper end portion. A piston seal member 56 that defines the lower end of the first pressure chamber 53 is disposed between the outer periphery of the first piston 52 and the inner periphery of the valve body 10.

The first piston 52 has a valve closing pressure receiving surface 52a facing the first pressure chamber 53. The pressure fluid in the first pressure chamber 53 acts on the valve closing pressure receiving surface 52a, thereby generating an action force in the downward direction (valve closing direction). The pressure receiving area of the valve closing pressure receiving surface 52a is larger than the pressure receiving area of the valve opening pressure receiving surface 49.

An opening chamber 57 formed between the piston seal member 56 of the first piston 52 and the first seal member 21 may be opened to the atmosphere through the opening hole 57a or may be opened to the atmosphere through another through-hole communicating with the opening chamber 57.

The delay flow path 54 has a first delay flow path hole 54a leading to the first port 13a, a second delay flow path hole 54b leading to the first pressure chamber 53, and a relay hole 54c formed between the first delay flow path hole 54a and the second delay flow path hole 54b.

The relay hole 54c is an elongated hole coaxially connected to the hole end 54d of the first delay flow path hole 54a. A hollow cylindrical valve body receiver 62 is accommodated inside the relay hole 54c. The relay hole 54c is opened to the atmosphere through an opening hole 63 formed in the valve body receiver 62.

A spherical check valve body 61 is disposed between the hole end 54d of the first delay flow path hole 54a and the valve body receiver 62 so as to be displaceable between a valve closing position (see FIG. 1 and FIG. 3) at which the check valve body 61 comes into contact with the hole end 54d to close the hole end 54d and a valve opening position (see FIG. 4) at which the check valve body 61 separates from the hole end 54d to open the hole end 54d. A compression spring 64 is interposed between the check valve body 61 and the valve body receiver 62. The check valve body 61 is constantly urged by the compression spring 64 in a direction in which it comes into contact with the hole end 54d of the first delay path hole 54a.

The position where the second delay flow path hole 54b communicates with the relay hole 54c is a part of the side surface of the relay hole 54c into which the valve body receiver 62 is fitted. A throttle portion 59 that is an annular gap is formed between the outer peripheral surface of the valve body receiver 62 and the inner peripheral surface of the relay hole 54c.

Therefore, when the check valve body 61 is in the valve closing position, the first delay flow path hole 54a is closed, and the second delay flow path hole 54b communicates with the atmosphere through the throttle portion 59, the relay hole 54c, and the opening hole 63 of the valve body receiver 62. When the check valve body 61 is in the valve opening position, the opening hole 63 is closed, and the first delay flow path hole 54a and the second delay flow path hole 54b communicate with each other through the relay hole 54c and the throttle portion 59.

The delay valve closing mechanism 35 operates as follows. After the opening and closing valve body 46b opens the first flow path 27 (see FIG. 4) due to the pressure fluid from the first port 13a, the pressure fluid from the first port 13a flows through the first delay flow path hole 54a, pushes the check valve body 61 open, and gradually flows into the first pressure chamber 53 in a state where the flow rate is restricted by the throttle portion 59. Accordingly, the fluid pressure in the first pressure chamber 53 gradually rises. When the action force in the valve closing direction (valve closing force) generated in the first piston 52 due to the action of the fluid pressure becomes larger than the valve opening force of the opening and closing valve body 46b generated by the valve opening pressure receiving surface 49, the inner body 20 descends in the figure, the opening and closing valve body 46b comes into contact with the opening and closing valve seat 46a, and the first flow path 27 is closed (see FIG. 5). As a result, the opening and closing valve body 46b temporarily opens the first flow path 27 only in the initial stage when the pressure fluid is supplied to the fluid pressure cylinder 2.

When the first port 13a is opened to the atmosphere and the pressure fluid is discharged, the fluid pressure in the first port 13a and the first delay flow path hole 54a decreases. Therefore, the check valve body 61 is pushed by the compression spring 64 and displaced to the valve closing position, and the second delay flow path hole 54b communicates with the atmosphere through the check valve chamber 60 and the opening hole 63. Therefore, the pressure fluid in the first pressure chamber 53 is discharged to the atmosphere through the opening hole 63.

The throttle valve mechanism 41 formed in the second flow path 28 has a throttle valve portion 67 including a throttle hole 40 formed in the inner body 20 and a needle 68 that is fitted in the throttle hole 40 and restrictedly opens the throttle hole 40. The needle 68 is formed at a tip portion of the valve rod 22.

A throttle valve seat 69 is formed at an end of the throttle hole 40, and a throttle valve seal 70 that comes into contact with and separates from the throttle valve seat 69 to open and close the second flow path 28 is attached to the outer periphery of the needle 68.

The inner body 20 and the valve rod 22 are provided with an opening and closing control mechanism 72 that opens and closes the needle 68 and an opening degree adjustment mechanism 73 that adjusts the opening degree of the needle 68.

The opening and closing control mechanism 72 has a second piston 75 formed in the valve rod 22. The second piston 75 is accommodated in the hollow hole 20a of the inner body 20 with a seal member 76 therebetween so as to be slidable in the direction of the axis L. A second pressure chamber 77 is defined between the pressure receiving surface 75a of the second piston 75 and the closing plate 55. A needle opening spring 79 is interposed between the back face of the second piston 75 and a spring accommodating tube 78 attached to the inner body 20. The needle opening spring 79 constantly urges the second piston 75 in a direction in which the throttle valve seal 70 of the needle 68 separates from the throttle valve seat 69 (valve opening direction). A conduction hole 80 for introducing the fluid pressure of the second port 13b into the second pressure chamber 77 is formed inside the valve rod 22. One end 80a of the conduction hole 80 opens at the tip of the valve rod 22, and the other end communicates with the second pressure chamber 77 through a communication hole 80b.

When the pressure fluid from the first port 13a is restrictedly supplied to the second port 13b through the throttle valve portion 67, and the fluid pressure on the second port 13b side thereby rises, the fluid pressure on the second port 13b side is introduced into the second pressure chamber 77 through the conduction hole 80. When the action force in the valve closing direction generated in the second piston 75 due to the action of this fluid pressure becomes larger than the spring force in the valve opening direction by the needle opening spring 79, the throttle valve seal 70 of the needle 68 comes into contact with the throttle valve seat 69 so that the throttle valve portion 67 is closed (see FIG. 6).

The opening degree adjustment mechanism 73 has a handle 84 for rotating the valve rod 22 and a cam mechanism 85 for displacing the valve rod 22 in the direction of the axis L in accordance with the rotation of the valve rod 22.

The handle 84 is a cylindrical cap-shaped member and is attached to the first end 11a of the valve body 10 so as to be rotatable about the axis L while covering the upper end portion of the valve body 10, the end plate 24, and the valve rod 22. The upper end portion of the valve rod 22 is fitted into a locking hole 84a formed inside the handle 84. The locking hole 84a is a non-circular hole having a flat portion in a part of the hole wall thereof, and the upper end portion of the valve rod 22 also has a flat portion in a part of the outer periphery thereof. The flat portions are brought into contact with each other so as to be engaged with each other, whereby the handle 84 and the valve rod 22 are connected to each other so as to be relatively movable in the direction of the axis L but mutually fixed in the rotational direction.

However, instead of providing the flat portions in the locking hole 84a and the valve rod 22, a key and a key groove may be provided.

The cam mechanism 85 has a tubular cam member 87 fixed inside the inner body 20, a helical cam surface 88 formed on the lower surface of the cam member 87 so as to surround the valve rod 22, and an abutting element 89 formed on the side surface of the valve rod 22. The upper end of the abutting element 89 abuts against a part of the cam surface 88, whereby the opening degree (initial opening degree) at the time of flow rate restriction in the throttle valve portion 67 is set. A force that brings the abutting element 89 into contact with the cam surface 88 is a spring force of the needle opening spring 79.

The cam surface 88 has a length that does not circle around the valve rod 22, and is inclined in a direction in which its height gradually decreases clockwise, that is, in a direction approaching the throttle hole 40. Therefore, when the valve rod 22 is rotated clockwise or counterclockwise by the handle 84, the abutting element 89 is displaced along the cam surface 88, so that the valve rod 22 advances or retreats in the direction of the axis L. Therefore, the degree of insertion of the needle 68 into the throttle hole 40 is changed, and the initial opening degree of the throttle valve portion 67 is adjusted.

The handle 84 can be locked at an arbitrary rotational position, and the initial opening degree of the throttle valve portion 67 can be arbitrarily set between the minimum opening degree and the maximum opening degree according to the rotation angle of the handle 84.

The opening area when the opening and closing valve body 46b temporarily opens the opening and closing valve seat 46a in the opening and closing valve portion 46 of the first flow path 27 is larger than the opening area (initial opening degree) when the needle 68 restrictedly opens the throttle hole 40 in the throttle valve portion 67 of the second flow path 28.

Reference sign 90 in the figure denotes a seal member that seals between the valve rod 22 and the closing plate 55.

Next, an example of the operation of the fluid control valve 1A and the fluid pressure cylinder 2 in the case of controlling the speed of the fluid pressure cylinder 2 using the fluid control valve 1A having the above configuration will be described with reference to FIGS. 1 to 6 and FIG. 8.

In this embodiment, the stroke of the working piston 7 and the piston rod 8 (hereinafter simply referred to as "working piston 7") of the fluid pressure cylinder 2 retreating from the position of the advancing end is the working stroke, and the stroke advancing from the position of the retreating end is the return stroke.

However, it goes without saying that the advancing stroke of the working piston 7 may be the working stroke and the retreating stroke may be the return stroke.

FIGS. 1 to 3 show the case where the solenoid valve 3 is switched to the first position 3a because the solenoid valve 3 is deenergized and the fluid pressure cylinder 2 occupies the position of the advancing end. At this time, pressure fluid is supplied to the head side chamber 2a of the fluid pressure cylinder 2 through the speed controller 5, and the rod side chamber 2b is opened to the atmosphere through the fluid control valve 1A. The fluid control valve 1A is in the normal position. In the first flow path 27 of the fluid control valve 1A, the opening and closing valve seal 46c of the valve closing body 46b comes into contact with the opening and closing valve seat 46a, so that the first flow path 27 is closed. In the second flow path 28, the valve rod 22 is urged in the valve opening direction by the needle opening spring 79, so that the needle 68 of the throttle valve portion 67 occupies an initial position where it restrictedly opens the throttle hole 40.

Figure 4:
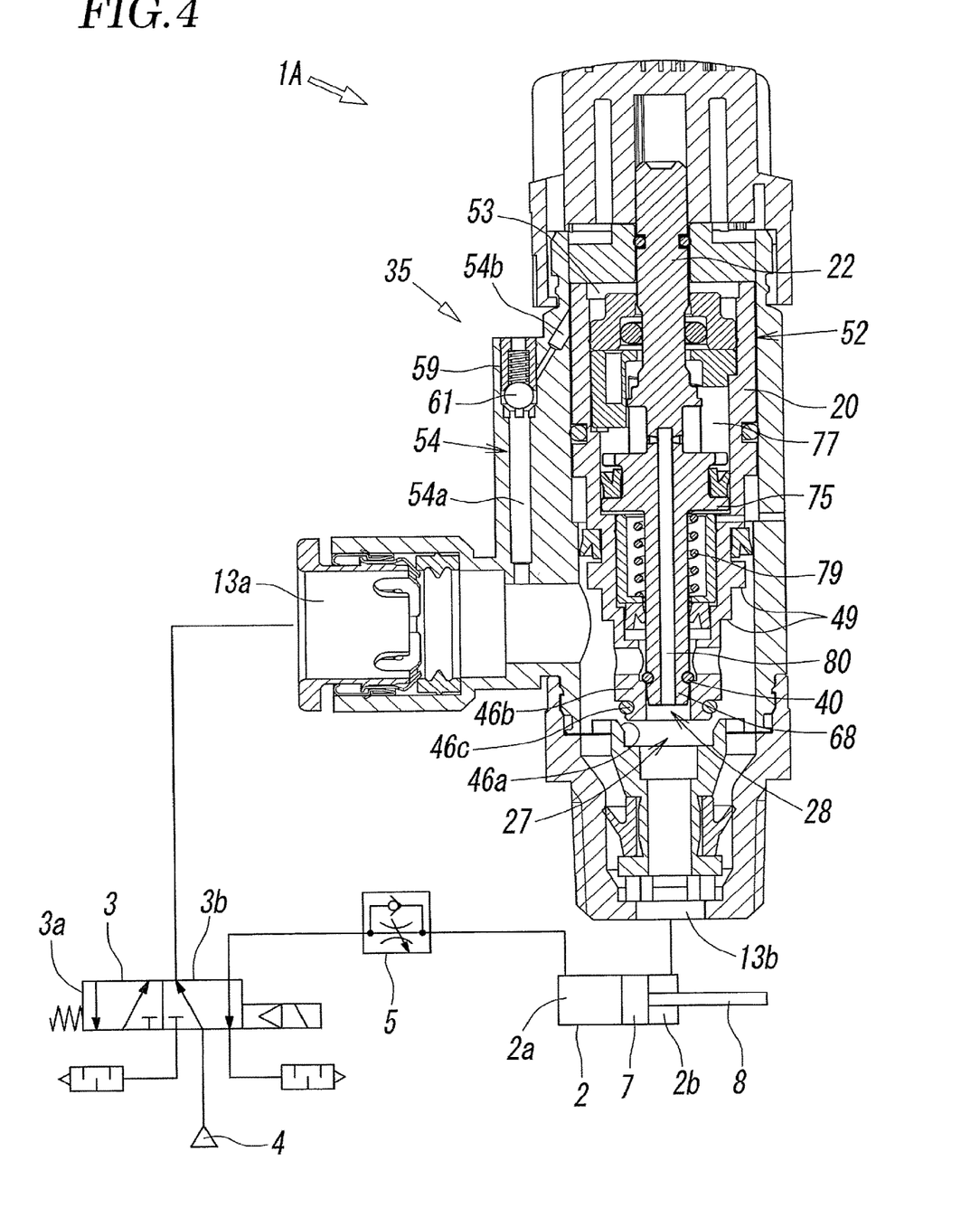
FIG. 4 is a sectional view showing the operation state of the fluid control valve immediately after the fluid pressure cylinder starts the working stroke (retreating stroke) in the fluid pressure circuit.

From this state, as shown in FIG. 4, the solenoid valve 3 is switched to the second position 3b by energization, the pressure fluid is supplied to the first port 13a of the fluid control valve 1A, and the head side chamber 2a of the fluid pressure cylinder 2 is opened to the atmosphere through the speed controller 5. The pressure fluid in the first port 13a acts on the valve opening pressure receiving surface 49 of the opening and closing valve body 46b to generate a thrust force in the valve opening direction, that is, a valve opening force. Therefore, due to the valve opening force, the inner body 20 is displaced upward integrally with the valve rod 22, the opening and closing valve body 46b separates from the opening and closing valve seat 46a, and the first flow path 27 opens. Therefore, the pressure fluid flows through the first flow path 27 to the second port 13b in a substantially free flow state, and is supplied to the rod side chamber 2b of the fluid pressure cylinder 2.

Figure 8:
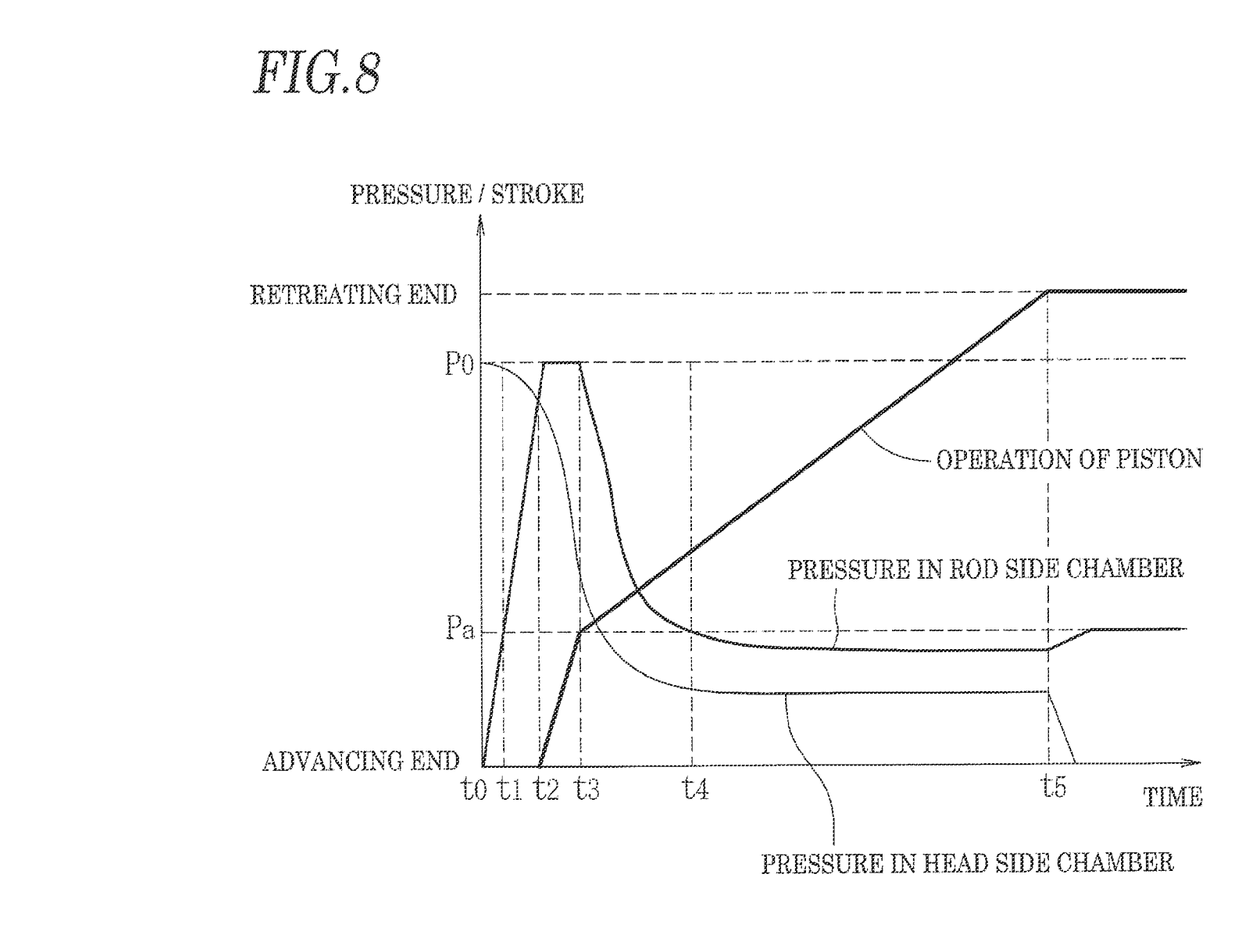
FIG. 8 is a diagram schematically showing the relationship between the pressure change in the rod side chamber and the head side chamber and the operation of the piston when the fluid pressure cylinder performs the working stroke.

As a result, as shown in FIG. 8, the pressure in the rod side chamber 2b starts to rapidly rise from the time t0, so that the working piston 7 starts retreating at a high speed from the time t2 when the pressure in the rod side chamber 2b approaches the set pressure Po. The initial operation of the working piston 7 is much faster than the initial operation of the working piston 7 in the case where the pressure fluid is supplied in a state where the flow rate is restricted from the beginning, and therefore excellent in responsiveness.

On the other hand, since the pressure fluid in the rod side chamber 2b flows from the second port 13b through the central hole 33 and the conduction hole 80 into the second pressure chamber 77, the fluid pressure in the second pressure chamber 77 rises. When the fluid pressure becomes higher than the control pressure Pa at the time t1, the action force in the valve closing direction acting on the second piston 75 exceeds the action force in the valve opening direction by the needle opening spring 79, whereby the valve rod 22 is pushed down against the spring force of the needle opening spring 79, and the needle 68 temporarily closes the throttle hole 40.

Since the pressure fluid from the first port 13a is gradually supplied into the first pressure chamber 53 through the delay flow path 54 in the delay valve closing mechanism 35 in a state where the flow rate is restricted by the throttle portion 59, the fluid pressure in the first pressure chamber 53 also gradually increases. When the downward valve closing force generated in the first piston 52 due to the action of the fluid pressure becomes larger than the upward valve opening force acting on the opening and closing valve body 46b, as shown in FIG. 5, the inner body 20 descends in the figure, and the opening and closing valve body 46b comes into contact with the opening and closing valve seat 46a, and the first flow path 27 is closed.

In FIG. 8, when the first flow path 27 is closed at the time t3, the piston 7 continues to advance due to the expansion force of the high pressure fluid pressure (compressed air) confined in the rod side chamber 2b, and accordingly, the fluid pressure in the rod side chamber 2b starts to decrease rapidly and curvilinearly, and at the same time, the speed of the working piston 7 is also decreased. When the fluid pressure in the rod side chamber 2b falls below the control pressure Pa at the time t4, the fluid pressure in the second pressure chamber 77 also decreases, so that the valve rod 22 is pushed up by the spring force of the needle opening spring 79, whereby the needle 68 opens the throttle hole 40. The pressure fluid from the first port 13a flows to the second port 13b in a state where the flow rate is restricted through only the second flow path 28, and is gradually supplied to the rod side chamber 2b of the fluid pressure cylinder 2. Therefore, the working piston 7 moves towards the retreating end at a slow, substantially constant speed, and reaches the retreating end at the time t5, and the working process is completed. Slightly later, the fluid pressure in the rod side chamber 2b reaches the control pressure pa, and the fluid pressure in the head side chamber 2a becomes zero.

Thus, when the working process of the working piston 7 is completed and the pressure in the rod side chamber 2b reaches the control pressure pa, the fluid pressure in the second port 13b and the second pressure chamber 77 rises. Therefore, as shown in FIG. 6, the valve rod 22 and the needle 68 descend, the throttle valve seal 70 comes into contact with the throttle valve seat 69, and the second flow path 28 is closed.

Next, when, from the state of FIG. 6, the solenoid valve 3 is again switched to the first position 3a, with reference also to FIG. 1, the rod side chamber 2b of the fluid pressure cylinder 2 is opened to the atmosphere through the fluid control valve 1A, and the pressure fluid is supplied to the head side chamber 2a through the speed controller 5. At this time, the pressure fluid in the rod side chamber 2b flows into the third flow path 29 through the second port 13b of the fluid control valve 1A, pushes open the first check valve 44, flows in a free flow state from the third flow path 29 to the first port 13a, and is discharged to the atmosphere through the first port 13a and the solenoid valve 3. Accordingly, the working piston 7 of the fluid pressure cylinder 2 performs the advancing stroke at a speed corresponding to the flow rate of the pressure fluid supplied through the speed controller 5, and moves to the advancing end.

When the working piston 7 moves to the advancing end and the fluid pressure in the second port 13b decreases, the fluid pressure in the second pressure chamber 77 also decreases, so that the valve rod 22 is pushed by the needle opening spring 79 and ascends, and the throttle valve seal 70 of the needle 68 separates from the throttle valve seat 69, whereby the second flow path 28 is opened. In the delay flow path 54, the check valve body 61 is pushed by the compression spring 64 to be displaced to the valve closing position, and the pressure fluid in the first pressure chamber 53 is discharged to the atmosphere through the opening hole 63. By this series of operations, the fluid control valve 1A returns to the normal position in FIG. 1.

It is conceivable that when, at the start of the advancing stroke of the fluid pressure cylinder 2, the pressure fluid in the rod side chamber 2b of the fluid pressure cylinder 2 starts to be discharged through the fluid control valve 1A, depending on the cross-sectional area of the throttle portion 59 of the delay flow path 54, the pressure fluid in the first pressure chamber 53 is rapidly discharged, whereby the opening and closing valve body 46b is pushed up by the pressure fluid (discharge fluid) flowing into the second port 13b and separated from the opening and closing valve seat 46a, and the first flow path 27 is opened.

Since the opened valve body 46b does not close by itself even after that, in order to avoid such a situation, it is possible to interpose a valve closing spring that urges the inner body 20 in the valve closing direction between the closing plate 55 and the end plate 24 so that the valve body 46b always occupies the valve closing position during the normal time. In this case, since the spring force of the valve closing spring acts in the direction opposite to the valve opening force of the opening and closing valve body 46b, the responsiveness at the start of the working process is slightly lower than that in the case where the valve closing spring is not provided. However, compared with the case where pressure fluid is supplied to the fluid pressure cylinder 2 in a state where the flow rate is restricted from the beginning through only the second flow path 28, the responsiveness is good.

However, even in the case where the valve closing spring is not provided, if the opening and closing valve body 46b remains open during the normal time, the next working stroke starts from the state where the opening and closing valve body 46b opens the first flow path 27, so that the process of opening the opening and closing valve body 46b becomes unnecessary, and the response becomes fast.

Figure 9:
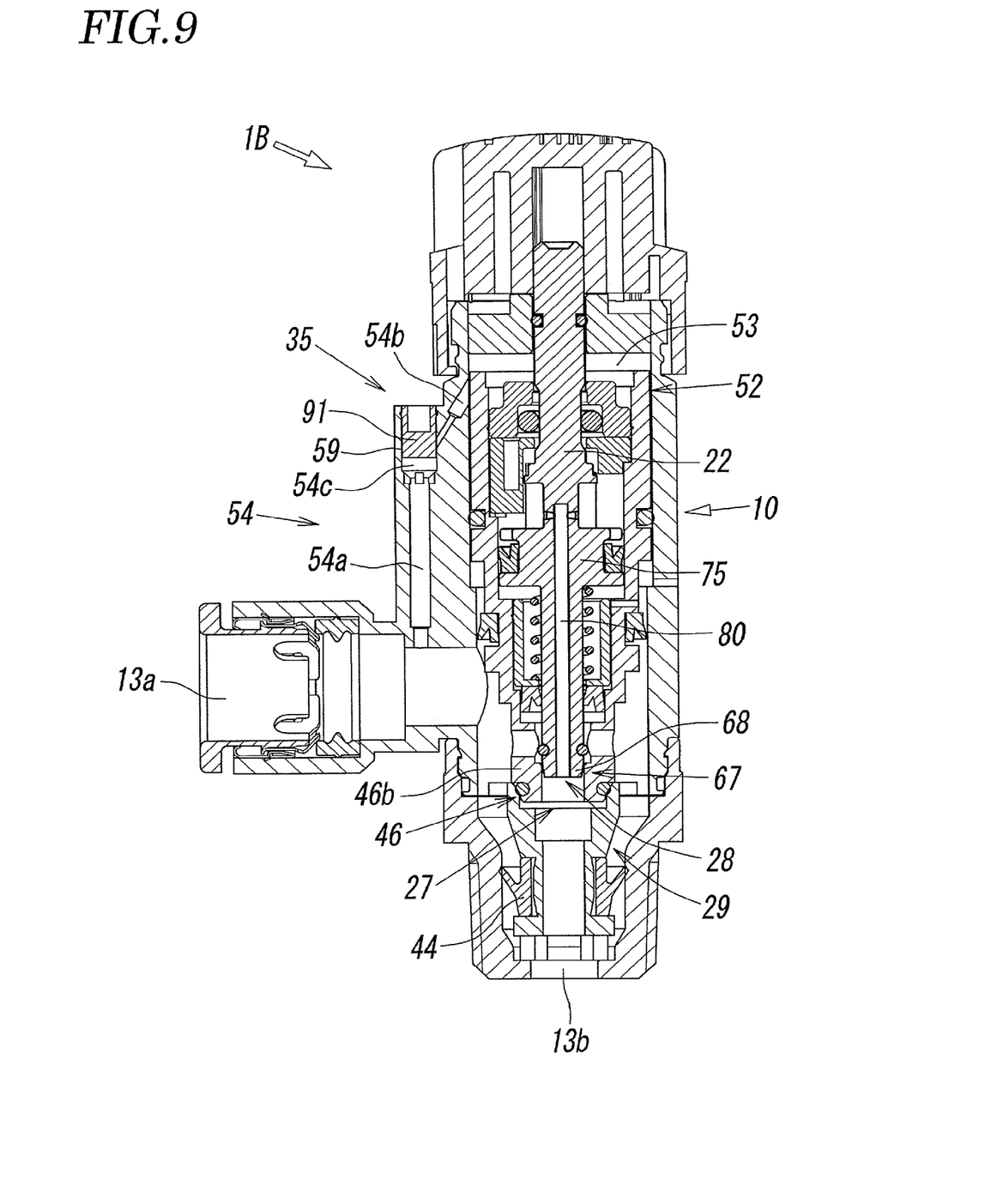
FIG. 9 is a sectional view showing a second embodiment of the fluid control valve according to the present invention.

FIG. 9 shows a fluid control valve according to a second embodiment of the present invention. The fluid control valve 1B of the second embodiment differs from the fluid control valve 1A of the first embodiment in that the first delay flow path hole 54a and the second delay flow path hole 54b of the delay flow path 54 always communicate with each other through the throttle portion 59. That is, a columnar closing member 91 is attached to the inside of the relay hole 54c interposed between the first delay flow path hole 54a and the second delay flow path hole 54b, and the throttle portion 59 is formed between the outer peripheral surface of the closing member 91 and the inner peripheral surface of the relay hole 54c.

Therefore, in the fluid control valve 1B of the second embodiment, the pressure fluid supplied to the first port 13a flows into the first pressure chamber 53 through the first delay flow path hole 54a, the throttle portion 59, and the second delay flow path hole 54b, and the pressure fluid discharged from the first pressure chamber 53 is discharged from the first port 13a through the second delay path hole 54b, the throttle portion 59, and the first delay path hole 54a.

The throttle portion 59 may be a variable throttle whose opening area can be adjusted. This also applies to the throttle portion 59 of the fluid control valve 1A of the first embodiment.

Since the configuration and operation of the fluid control valve 1B other than those described above are substantially the same as those of the fluid control valve 1A of the first embodiment, the same reference signs as those of the fluid control valve 1A of the first embodiment are assigned to the same main components of both, and detailed description of the configuration and operation will be omitted.

Figure 10:
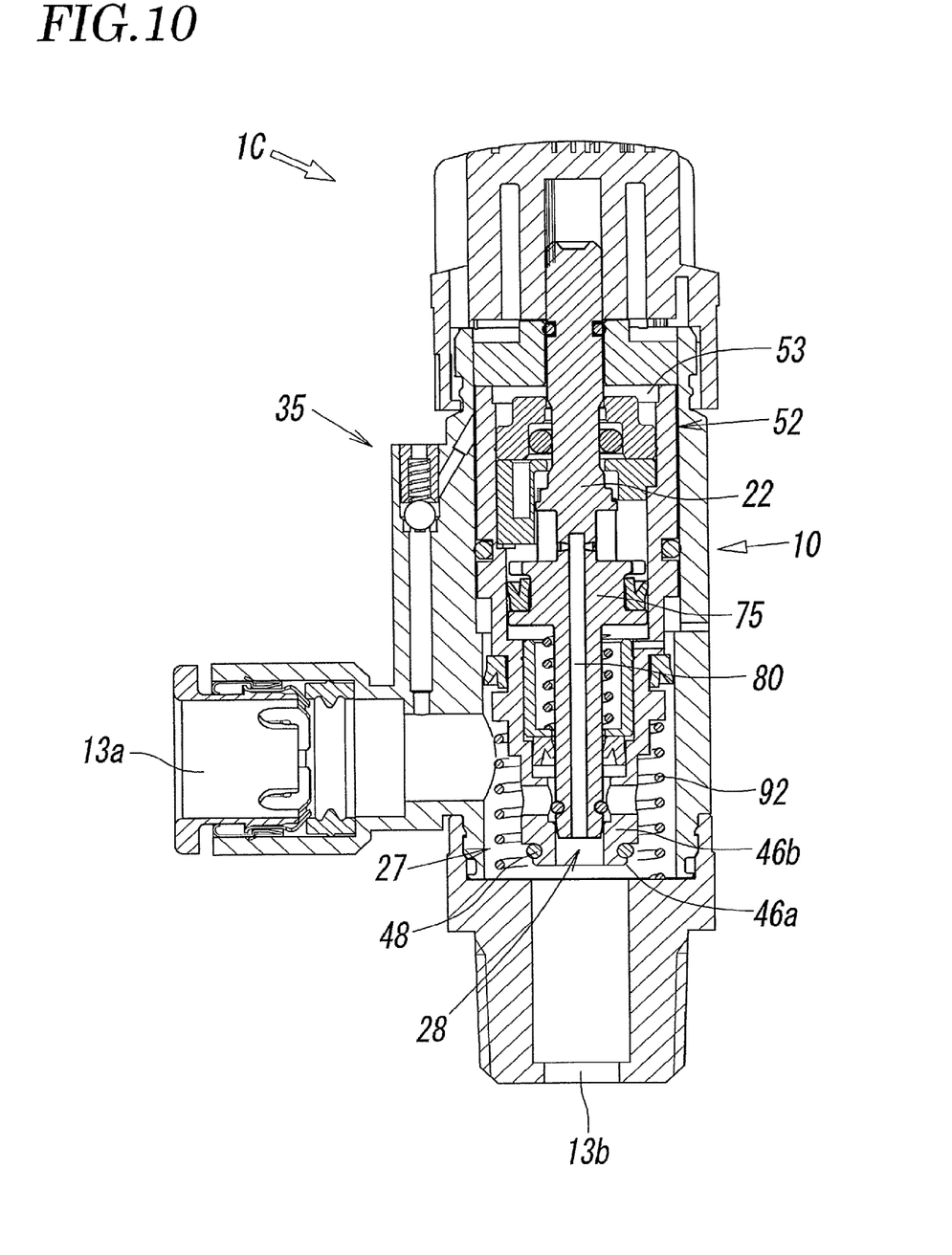
FIG. 10 is a sectional view showing a third embodiment of the fluid control valve according to the present invention.

FIG. 10 shows a third embodiment of the fluid control valve according to the present invention. The fluid control valve 10 of the third embodiment differs from the fluid control valve 1A of the first embodiment in that the fluid control valve 10 of the third embodiment does not have the third flow path 29 and the first check valve 44 in the third flow path 29 which the fluid control valve 1A of the first embodiment has, and in that a valve opening spring 92 is interposed between the opening and closing valve body 46b and the valve body 10, and the opening and closing valve body 46b is urged by the valve spring 92 in a direction in which the opening and closing valve body 46b separates from the opening and closing valve seat 46a (valve opening direction), whereby the opening and closing valve body 46b occupies the valve opening position and opens the first flow path 27 during the normal time. Therefore, in the third embodiment, the valve opening force generating means 47 is the valve opening spring 92.

In this fluid control valve 1A, when pressure fluid is supplied to the first port 13a, the pressure fluid does not go through the process of opening the opening and closing valve body 46b, and flows to the second port 13b through the first flow path 27 which is open from the beginning. Therefore, the response is superior to that of the fluid control valve 1A of the first embodiment.

The pressure fluid discharged from the fluid pressure cylinder flows from the second port 13b through the opened first flow path 27 to the first port 13a in a free flow state.

However, the fluid control valve 1C may have the third flow path 29 and the first check valve 44 which the fluid control valve 1A of the first embodiment has. In this case, the pressure fluid discharged from the fluid pressure cylinder flows from the second port 13b, through both the opened first flow path 27 and the first check valve 44 of the third flow path, to the first port 13a.

Since the configuration and operation of the fluid control valve 1C other than those described above are substantially the same as those of the fluid control valve 1A of the first embodiment, the same reference signs as those of the fluid control valve 1A of the first embodiment are assigned to the same main components of both, and detailed description of the configuration and operation will be omitted.

Thus, the fluid control valve can realize simplification of structure and reduction in size by reasonably incorporating the functions of a needle valve, a flow rate control valve, a check valve, etc. into one valve body, and can improve the fluid control capability and the responsiveness by providing an opening and closing valve mechanism that temporarily opens the flow path when pressure fluid is supplied to the first port.

REFERENCE SIGNS LIST 1A, 1B, 1C fluid control valve
10 valve body
13a first port
13b second port
20 inner body
22 valve rod
27 first flow path
28 second flow path
29 third flow path
34 opening and closing valve mechanism
35 delay valve closing mechanism
40 throttle hole
41 throttle valve mechanism
44 first check valve
46 opening and closing valve portion
46a opening and closing valve seat
46b opening and closing valve body
49 pressure receiving surface
52 first piston
53 first pressure chamber
54 delay flow path
59 throttle portion
67 throttle valve portion
68 needle
75 second piston
77 second pressure chamber
79 needle opening spring
80 conduction hole
92 valve opening spring
L axis L

The invention claimed is:

1. A fluid control valve comprising a first port and a second port provided in a valve body, and a first flow path and a second flow path that connect the first port and the second port in parallel,
  wherein the first flow path is provided with an opening and closing valve mechanism that temporarily opens the first flow path when pressure fluid is supplied to the first port,
  wherein the second flow path is provided with a throttle valve mechanism that restrictedly opens the second flow path,
  wherein the opening and closing valve mechanism has an opening and closing valve portion including an opening and closing valve seat that surrounds the first flow path and an opening and closing valve body that comes into contact with and separates from the opening and closing valve seat to open and close the first flow path, a valve opening force generating means that generates a valve opening force in the opening and closing valve body, and a delay valve closing mechanism that closes the opened opening and closing valve body after a delay time has elapsed,
  wherein the throttle valve mechanism has a throttle valve portion including a throttle hole that forms a part of the second flow path and a needle that fits into the throttle hole,
  wherein the opening and closing valve portion and the throttle valve portion are disposed coaxially along an axis passing through the inside of the valve body, and
  wherein the opening area when the opening and closing valve body temporarily opens the first flow path is larger than the opening area when the throttle valve portion restrictedly opens the second flow path.

2. The fluid control valve according to claim 1, wherein the delay valve closing mechanism has a first piston connected to the opening and closing valve body, a first pressure chamber faced by the first piston, and a delay flow path connecting the first pressure chamber and the first port, a throttle portion is formed in the delay flow path, and when a valve closing force generated in the first piston by the action of the pressure fluid introduced into the first pressure chamber through the delay flow path exceeds the valve opening force generated in the opening and closing valve body by the valve opening force generating means, the opening and closing valve body is pressed against the opening and closing valve seat by the displacement of the first piston to close the first flow path.

3. The fluid control valve according to claim 2, wherein an inner body is accommodated in the valve body so as to be displaceable along the axis, the opening and closing valve body and the first piston are formed in the inner body, and the opening and closing valve seat is formed in the valve body.

4. The fluid control valve according to claim 3, wherein a valve rod is accommodated inside the inner body so as to be displaceable along the axis, the needle is formed in the valve rod, and the throttle hole is formed in the inner body.

5. The fluid control valve according to claim 4, wherein the valve rod is provided with a second piston, the second piston faces a second pressure chamber formed inside the inner body, the second pressure chamber communicates with the second port through a conduction hole formed inside the valve rod, and when the fluid pressure in the second port is introduced into the second pressure chamber through the conduction hole, the second piston is displaced by the action of the fluid pressure, and the needle closes the throttle hole.

6. The fluid control valve according to claim 5, wherein a needle opening spring is interposed between the inner body and the valve rod, and the needle opening spring constantly urges the valve rod toward a position where the needle restrictedly opens the throttle hole.

7. The fluid control valve according to claim 1, further comprising a third flow path connecting the first port and the second port, wherein the third flow path is provided with a first check valve, and the first check valve prevents a forward flow of the pressure fluid from the first port toward the second port, and allows a backward flow of the pressure fluid from the second port toward the first port.

8. The fluid control valve according to claim 1, wherein the valve opening force generating means is a valve opening pressure receiving surface formed in the opening and closing valve body, and the valve opening pressure receiving surface receives the action of the pressure fluid supplied to the first port to generate the valve opening force.

9. The fluid control valve according to claim 1, wherein the valve opening force generating means is a valve opening spring that is interposed between the valve body and the opening and closing valve body and urges the opening and closing valve body in the valve opening direction.

* * * * *